US009519418B2

(12) United States Patent
Tuli

(10) Patent No.: US 9,519,418 B2
(45) Date of Patent: Dec. 13, 2016

(54) METHOD AND APPARATUS FOR PROVIDING A MULTI-STAGE DEVICE TRANSITION MECHANISM INITIATED BASED ON A TOUCH GESTURE

(75) Inventor: Apaar Tuli, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1148 days.

(21) Appl. No.: 13/008,477

(22) Filed: Jan. 18, 2011

(65) Prior Publication Data
US 2012/0182226 A1 Jul. 19, 2012

(51) Int. Cl.
*G06F 3/0488* (2013.01)

(52) U.S. Cl.
CPC ......... *G06F 3/0488* (2013.01); *G06F 3/04883* (2013.01)

(58) Field of Classification Search
CPC ........ G06F 21/36; G06F 21/44; G06F 21/445; G06F 21/51; G06F 21/554; G06F 21/62; G06F 21/629; G06F 2221/0735; G06F 2221/0742; G06F 2221/2113; G06F 2221/2141; G06F 2221/2145; G06F 2221/2149; G06F 3/0488; H04M 1/72577
USPC ................................................ 715/763, 784
See application file for complete search history.

(56) References Cited

U.S. PATENT DOCUMENTS

| 7,657,849 | B2 * | 2/2010 | Chaudhri ............ G06F 3/04883 345/173 |
| 2003/0184525 | A1 | 10/2003 | Tsai |
| 2007/0220444 | A1 * | 9/2007 | Sunday et al. ................ 715/788 |
| 2009/0006991 | A1 * | 1/2009 | Lindberg et al. ............. 715/763 |
| 2009/0094562 | A1 * | 4/2009 | Jeong et al. .................. 715/863 |
| 2009/0259958 | A1 | 10/2009 | Ban |
| 2009/0267909 | A1 * | 10/2009 | Chen .................... G06F 3/04883 345/173 |
| 2010/0123658 | A1 * | 5/2010 | Demuynck et al. .......... 345/157 |
| 2010/0248689 | A1 | 9/2010 | Teng et al. |

(Continued)

FOREIGN PATENT DOCUMENTS

| CN | 101384051 A | 3/2009 |
| CN | 101404687 A | 4/2009 |

(Continued)

OTHER PUBLICATIONS

International Search Report and Written Opinion from International Application No. PCT/FI2012/050006, mailed Apr. 3, 2012.

(Continued)

*Primary Examiner* — Quan-Zhen Wang
*Assistant Examiner* — Xuemei Zheng
(74) *Attorney, Agent, or Firm* — Alston & Bird LLP

(57) ABSTRACT

A method for providing a multi-stage device transition mechanism that is initiated based on a touch gesture may include receiving an indication of a transition gesture being performed at a touch screen display of a device in a first device state, and causing initiation of transition from the first device state to a second device state responsive to performance of the transition gesture, the initiation of transition comprising progressively replacing a display view associated with the first device state with a display view associated with the second device state based on a degree of repetition of the transition gesture. A corresponding apparatus and computer program product are also provided.

25 Claims, 10 Drawing Sheets

(56) References Cited

U.S. PATENT DOCUMENTS

| | | | | |
|---|---|---|---|---|
| 2010/0299598 A1* | 11/2010 | Shin | ............... | G06F 3/0488 715/702 |
| 2010/0306693 A1* | 12/2010 | Brinda | .................. | 715/784 |
| 2011/0028186 A1* | 2/2011 | Lee et al. | ................ | 455/566 |
| 2011/0072400 A1* | 3/2011 | Watanabe et al. | .......... | 715/863 |
| 2011/0093778 A1* | 4/2011 | Kim et al. | .............. | 715/702 |
| 2011/0271181 A1* | 11/2011 | Tsai et al. | ............... | 715/702 |

FOREIGN PATENT DOCUMENTS

| | | |
|---|---|---|
| CN | 101828162 A | 9/2010 |
| CN | 101907968 A | 12/2010 |

OTHER PUBLICATIONS

*tech news*; [online]; [Retrieved on Oct. 17, 2011]; Retrieved from the Internet<URL: http://technews-blog4u.blogspot.com/2010/09/more-meego-phone-ui-screenshots-dual_04.html ; 7 pages.

Office Action and Search Report from corresponding Chinese Patent Application No. 201280005654.2 dated Aug. 5, 2015.

Office Action for Chilean Application No. 2013-02054 dated Mar. 25, 2015.

Office Action for Vietnamese Application No. 1-2013-02209 dated Apr. 19, 2016.

Office Action for Chinese Application No. 201280005654.2 dated Apr. 26, 2016.

* cited by examiner

METHOD AND APPARATUS FOR PROVIDING A MULTI-STAGE DEVICE TRANSITION MECHANISM INITIATED BASED ON A TOUCH GESTURE

TECHNOLOGICAL FIELD

Some example embodiments of the present invention relate generally to user interface technology and, more particularly, relate to a method and apparatus for providing a multi-stage device transition mechanism that is initiated based on a touch gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of a multi-stage device transition mechanism that is initiated based on a touch gesture. In some cases, for example, the device may be transitioned between a locked state, an unlocked state and a transitional state based on the application of a touch gesture.

Some embodiments of the invention may provide a method, apparatus and computer program product for improving user experience relating to devices having touch screen interfaces. As a result, for example, mobile terminal users may enjoy improved capabilities with respect to accessing content and other services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3A:
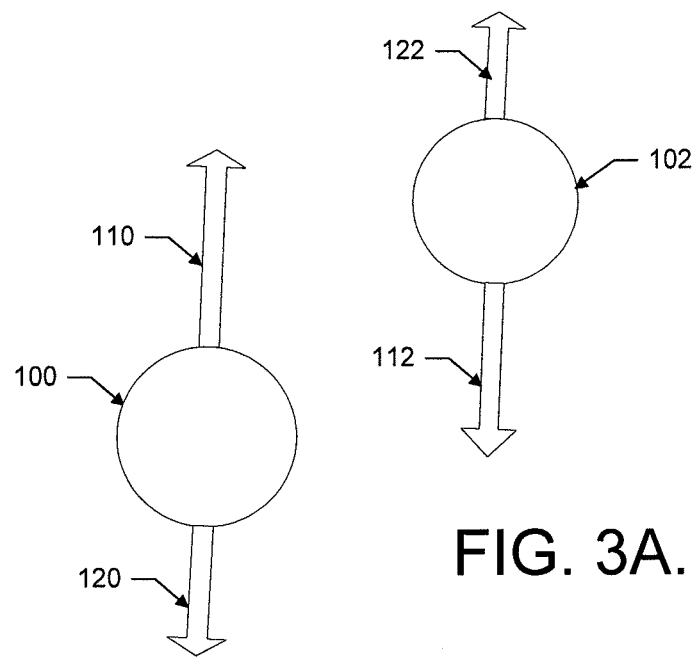
Figure 3B:
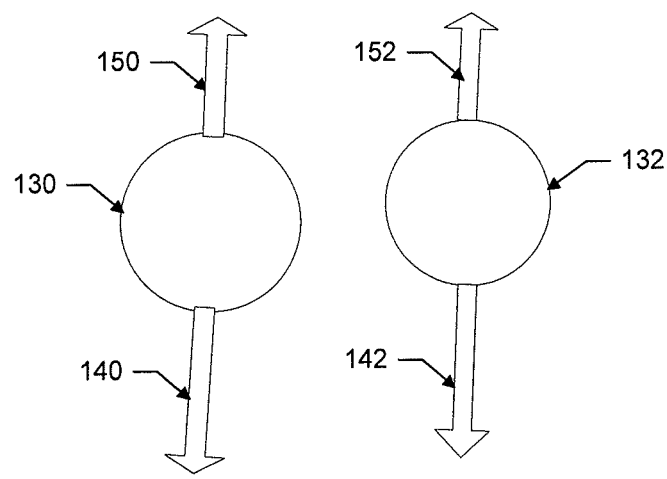
Figure 5:
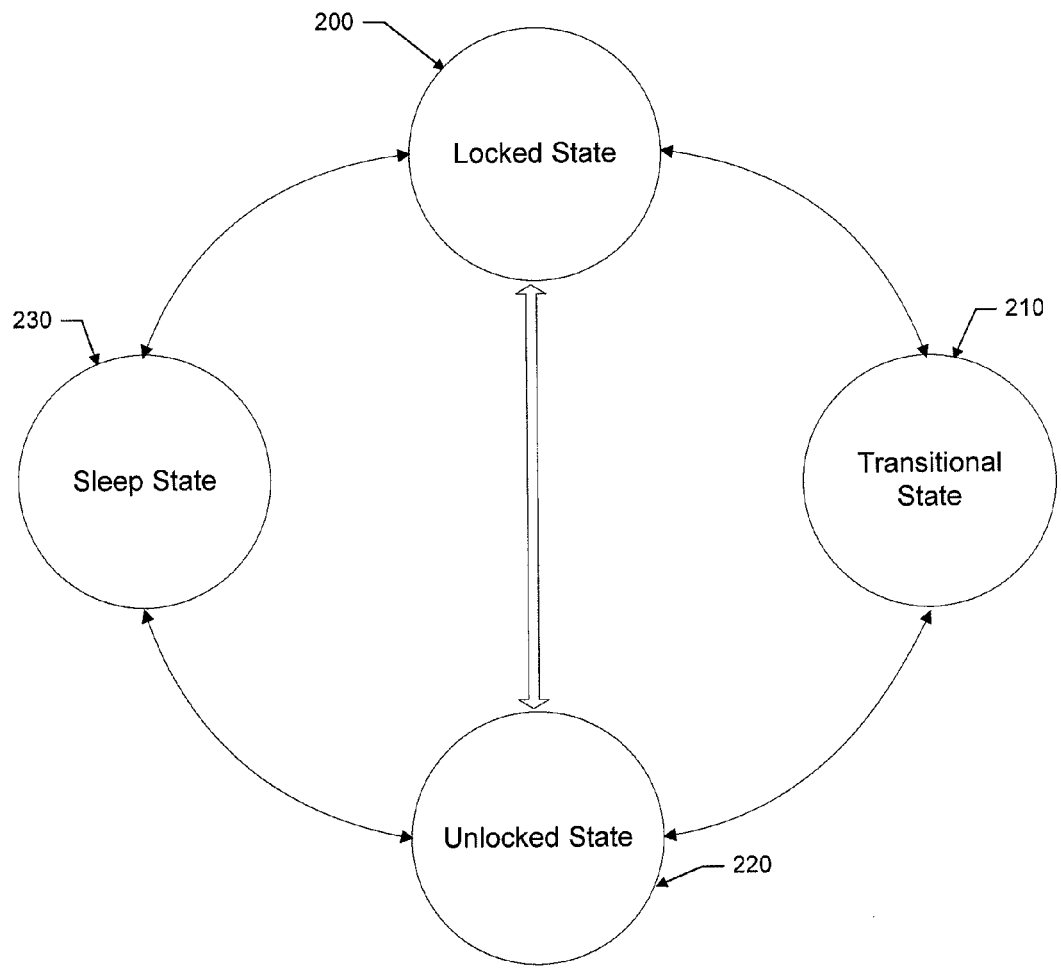
Figure 6:
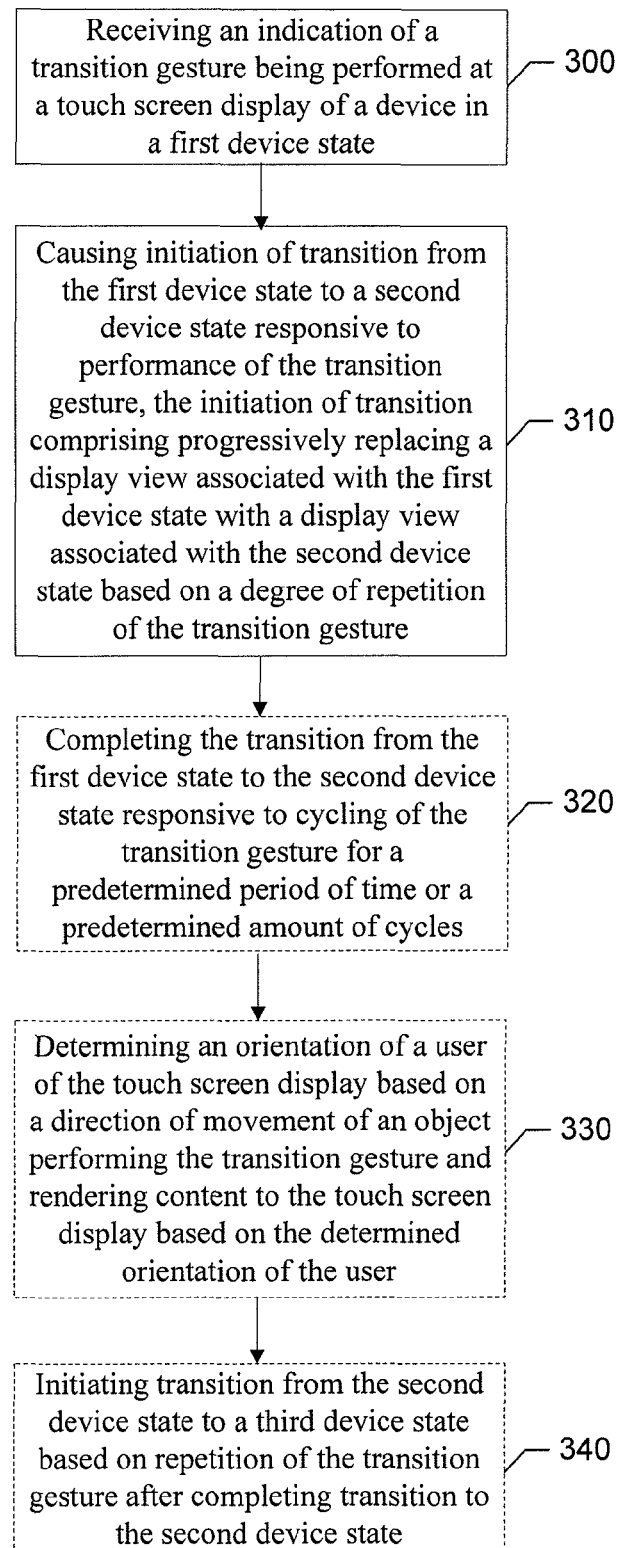

FIG. 3, which includes FIGS. 3A and 3B, shows some examples of transition gestures that may trigger a state transition according to an example embodiment of the present invention;

FIG. 4, which includes FIGS. 4A to 4E, illustrates some example screens that may be displayed while transitioning between states according to an example embodiment of the present invention;

FIG. 5 shows an example interaction cycle for states that may be transitioned through according to an example embodiment of the present invention; and FIG. 6 is a block diagram according to an example method for providing a multi-stage device transition mechanism that is initiated based on a touch gesture according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Thus, touch screen devices have been becoming increasingly popular.

Many electronic devices also have multiple different stages or user interface states that may be defined for the devices in order to conserve energy or control access to various different applications or content items. As an example, many devices may have an unlocked state in which the user may directly interact with items presented on the device (e.g., on the home screen or via device menus). The unlocked state may represent a state from which various activities may be undertaken, functions may be initiated and/or applications may be launched. The activities, functions and/or applications may also operate or run in the unlocked state. In a locked state, direct interaction with most functions and/or applications may not be allowed until the device transitions first into the unlocked state. The locked state may provide a locked screen (e.g., presenting either a blank screen or a predetermined wallpaper or other display screen corresponding to a locked user interface). The locked screen may hide content or access mechanisms for accessing content or applications and generally prevent interaction therewith. For example, the locked screen may obstruct the view of the home screen or content associated with an application-specific display screen that was being displayed prior to the device being placed in the locked state. The locked screen may also prevent unintentional activations or interactions with the user interface. Moreover, when a device is in the locked state (or asleep) power consumption may be reduced by limiting the processing required by the device to run applications, present content or the like.

Many devices provide specific user inputs that may be used to shift the device directly from the locked state to the unlocked state. However, some example embodiments of the present invention may further define a transitional state that may be accessed between the locked state and the unlocked state by the initiation of a corresponding touch gesture. The touch gesture may be implemented for a certain length of time in order to transition from either the locked or unlocked state into the transitional state in which various user defined or predefined functions or content items may be presented for user interaction. The transitional state may be maintained after it is reached by maintaining contact between the object initiating the touch gesture and the touch screen display. However, if the touch gesture is continued to be applied, the device may continue to transition from the transitional state to either the unlocked or the locked state, respectively.

It should be appreciated that, in the context of example embodiments, any of a variety of different touch gestures may be defined as a transition gesture (e.g., a gesture that, when recognized, initiates a state or stage change through the transitional state as described above). One example of a transition gesture may be a tickle gesture that may be defined by providing a touch with at least two objects where the objects are substantially simultaneously moved in opposite directions to one another. Thus, for example, one finger may be moved over the screen toward the user while the other finger is moved away from the user simulating a tickle motion. In another example, the movement of two fingers may not be consecutive or concurrent. For example, a first finger may move downward to reach its lowest point and then, after the first finger has stopped moving, a second finger may move in the same downward direction while the first finger is lifted. When the second finger reaches its lowest point, the cycle may be repeated with the first finger moving downward again (from a similar start point to the previous cycle) while the second finger is lifted. As such, for example, the gesture could be one-directional so that movement of the fingers (while in contact with the screen) is in the same direction only (perhaps repeatedly). Other motions may also be used to define a transition gesture such as the movement of both fingers in the same direction or the use of more or less fingers (or other objects) to define movement in any of a number of other predefined and recognizable patterns.

Figure 1:
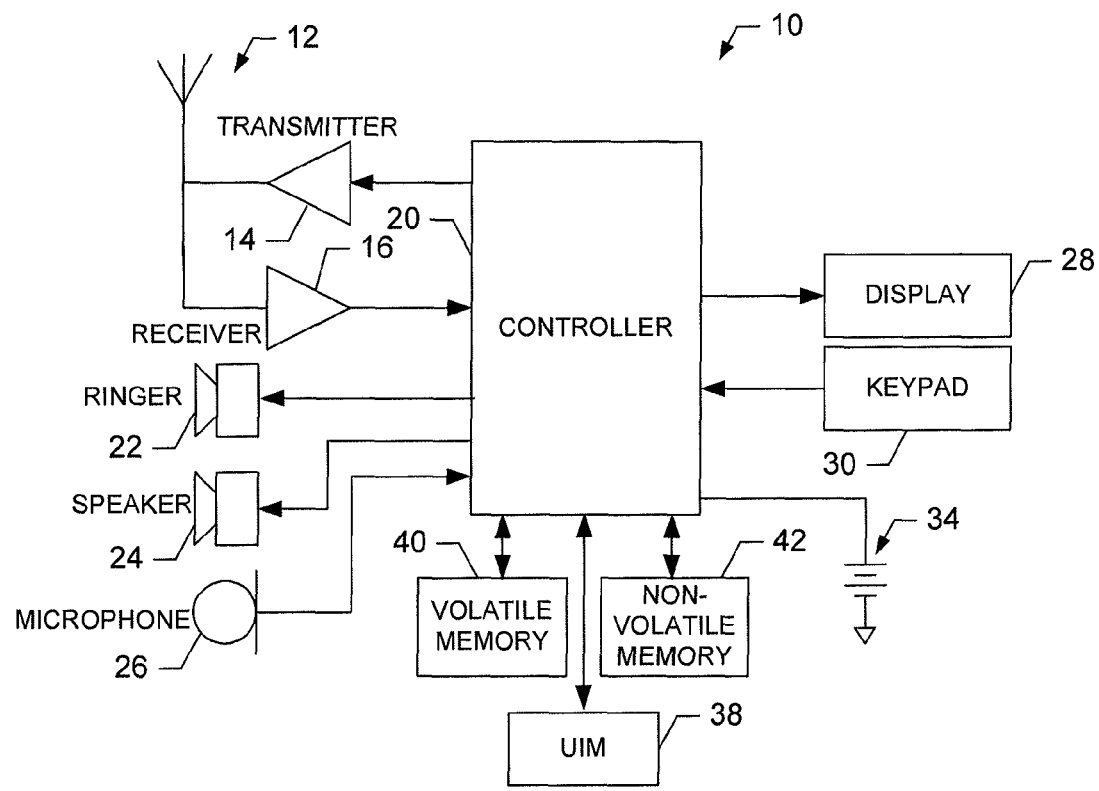
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a multi-stage device transition mechanism that is initiated based on a touch gesture are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
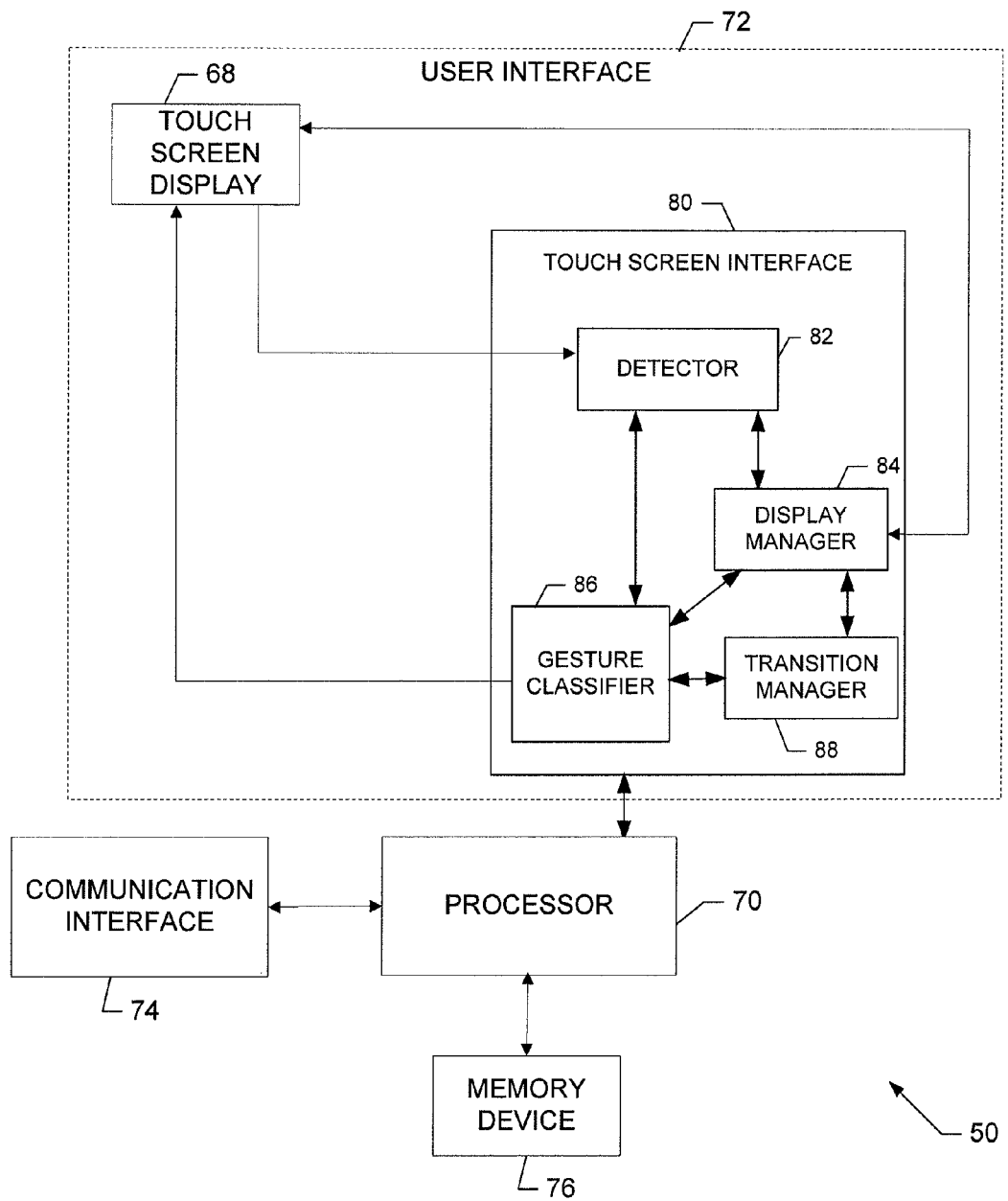
FIG. 2 is a schematic block diagram of an apparatus for providing a multi-stage device transition mechanism that is initiated based on a touch gesture according to an example embodiment of the present invention.

It should also be noted that while FIG. 2 illustrates one example of a configuration of an apparatus for providing a multi-stage device transition mechanism that is initiated based on a touch gesture, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a multi-stage device transition mechanism that is initiated based on a touch gesture is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector).

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, a gesture classifier 86 and a transition manager 88. Each of the detector 82, the display manager 84, the gesture classifier 86 and the transition manager 88 may be any device or means embodied in either hardware or a combination of hardware and software configured to perform the corresponding functions associated with the detector 82, the display manager 84, the gesture classifier 86 and the transition manager 88, respectively, as described herein. In an exemplary embodiment, each of the detector 82, the display manager 84, the gesture classifier 86 and the transition manager 88 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out), a tickle gesture and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other. A tickle gesture or motion pattern may be defined as a touch (or multi-touch) event followed by rapid back and forth movement of the object (or objects) initiating the touch event(s). The tickle gesture or motion pattern may include movement of multiple objects in either the same or different directions. In some examples, the objects associated with causing the multi-touch event may be spaced apart by any initial distance so long as the subsequent movement of the objects is in a direction apart from each other. Touch events may be performed as a single continuous gesture in some cases or may be made up of a series of successive smaller events.

In an example embodiment, the gesture classifier 86 may be configured to communicate detection information regarding the recognition, detection and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

In an example embodiment, the display manager 84 may be configured to interface with the transition manager 88 in response to a determination (e.g., by the gesture classifier 86) that a transition gesture has occurred. The transition gesture may be a predetermined gesture from among any detectable gesture that, when detected, may initiate a state transition between a locked state, a transitional state and/or an unlocked state. Thus, the transition manager 88 may be configured to trigger a transition between the locked state, the transitional state, and/or the unlocked state based on the occurrence of the transition gesture and the current state of the device associated with the apparatus 50. FIG. 3, which includes FIGS. 3A and 3B, shows some examples of transition gestures that may trigger a state transition. However, it should be appreciated that numerous other gestures could also be used involving more or less objects or fingers and involving other shapes or movement patterns.

In some embodiments, state transitions may not be initiated instantaneously in response to detection of the transition gesture. Instead, the transition gesture may be repeatedly cycled in order to drive progression from one state to another state. In some cases, the cycling may occur for a predetermined (or threshold) amount of time in order to cause a state change. However, in other cases, the transition gesture may be repeated a predetermined (or threshold) number of times in order to cause a state change. As such, state transition may be triggered based on an amount (e.g., in terms of time or number of cycles) of cycling of the transition gesture. In some embodiments, the transition gesture may include movement of objects over the screen as described above. However, it should be appreciated that the "movement" may include movement of the object while contact is maintained with the screen, or movement of the object relative to the screen. Thus, knocking on the screen, tapping on the screen, or in some cases also hovering over the screen may initiate transition gestures in some examples. Moreover, in some examples, different interactions may be defined for different movement conditions sensed. For example, if hovering is detected instead of contact, a different interaction may be provided. For example, if hovering is detected since the user is making a gesture through a garment rather than directly on the screen, the device may initiate voice interaction since it may be assumed that the device is in the user's pocket and cannot be viewed.

As shown in FIG. 3A, an initial touch position 100 of a first object (e.g., finger) is shown along with an initial touch position 102 of a second object. The first object may then be moved in a first direction indicated by arrow 110, while the second object is moved in a second direction that is substantially opposite to the first direction as indicated by arrow 112. Thereafter, the first object may be moved in the second direction as indicated by arrow 120, while the second object is moved in the first direction as indicated by arrow 122. Although simultaneous movement of the objects is described in this example, it should be appreciated that the objects could alternatively move one at a time or alternately. In some cases, the gesture classifier 86 may determine that a speed of motion of the objects in the first and second direction is above a threshold before a gesture can be classified as the transition gesture and may also be responsible for counting cycles or the amount of time that the transition gesture is applied. Thus, as indicated above, the movements indicated from the arrows in FIG. 3A may be repeated for a given amount of time or a given number of cycles to fully complete a state transition.

In some embodiments, the gesture classifier 86 may be further configured to infer a device orientation with respect to the user based on the directions in which the objects move. For example, the gesture classifier 86 may be configured to assume that the user is oriented in line with the direction of motion of the objects (e.g., that the user is moving the objects substantially directly toward and away from the user). In some situations, the gesture classifier 86 may provide this information to the display manager 84 so that the display manager 84 may orient content that is displayed based on the inferred position of the user. In other words, some example embodiments may determine user orientation relative to the display based on the direction of motion of objects causing the transition gesture and render content thereafter based on the determined user orientation.

As shown in FIG. 3B, which illustrates another example, an initial touch position 130 of a first object (e.g., finger) is shown along with an initial touch position 132 of a second object. In this example, the first object may then be moved in a first direction indicated by arrow 140 while the second object is also moved in the first direction as indicated by arrow 142. Thereafter, the first object may be moved in a second direction that is substantially opposite to the first direction as indicated by arrow 150, while the second object is also moved in the second direction as indicated by arrow 152. The gesture may then be repeated for a given amount of time or a given number of cycles. As indicated above, the gesture classifier 86 may determine that a speed of motion of the objects in the first and second direction is above a threshold before a gesture can be classified as the transition gesture and also count cycles or time for which the gesture is applied. Additionally, the gesture classifier 86 may be further configured to infer device orientation as described above.

In an example embodiment, the display manager 84 may be configured to control the display of information based on the current state of the device and therefore also based on interaction with the transition manager 88. In an example embodiment, the display manager 84 may be configured to facilitate normal touch screen user interface operation when the device is in the unlocked state. However, in response to the device being in the transitional state, the display manager 84 may be configured to limit user interface options to specific options that may be defined for or associated with the transitional state. Similarly, for the locked state, the display manager 84 may be configured to limit user interface options even further (e.g., to only those interactions that unlock the device or cause a state transition).

In an example embodiment, the transition manager 88 may be configured to identify the occurrence of the transition gesture to trigger state transitions as indicated above. Moreover, since the transition gesture may be provided from any initial state (e.g., from the locked state, the unlocked state or the transitional state), in some cases the transition gesture may be a distinct gesture that has no other functionality associated therewith other than initiation of the state transition. Thus, for example, when the transition gesture is provided during display of a home screen or an application specific screen, the transition gesture may not be interpreted as performing a different function (from triggering state transition) in the context of the screen or application currently being displayed or run.

In some embodiments, in response to detection of the transition gesture, the transition manager 88 may inform the display manager 84 to provide display effects that correspond to a state change. In some examples, the display effects that may be provided responsive to a state change may include a fading of the screen from which the transition is occurring into the screen to which the transition is occurring. In some examples, the transition may occur in the local region of the gesture, but more distant portions of the screen may remain dimmed or blacked (or not transitioned) longer than the local region or until a transition is completed.

Figure 4A:
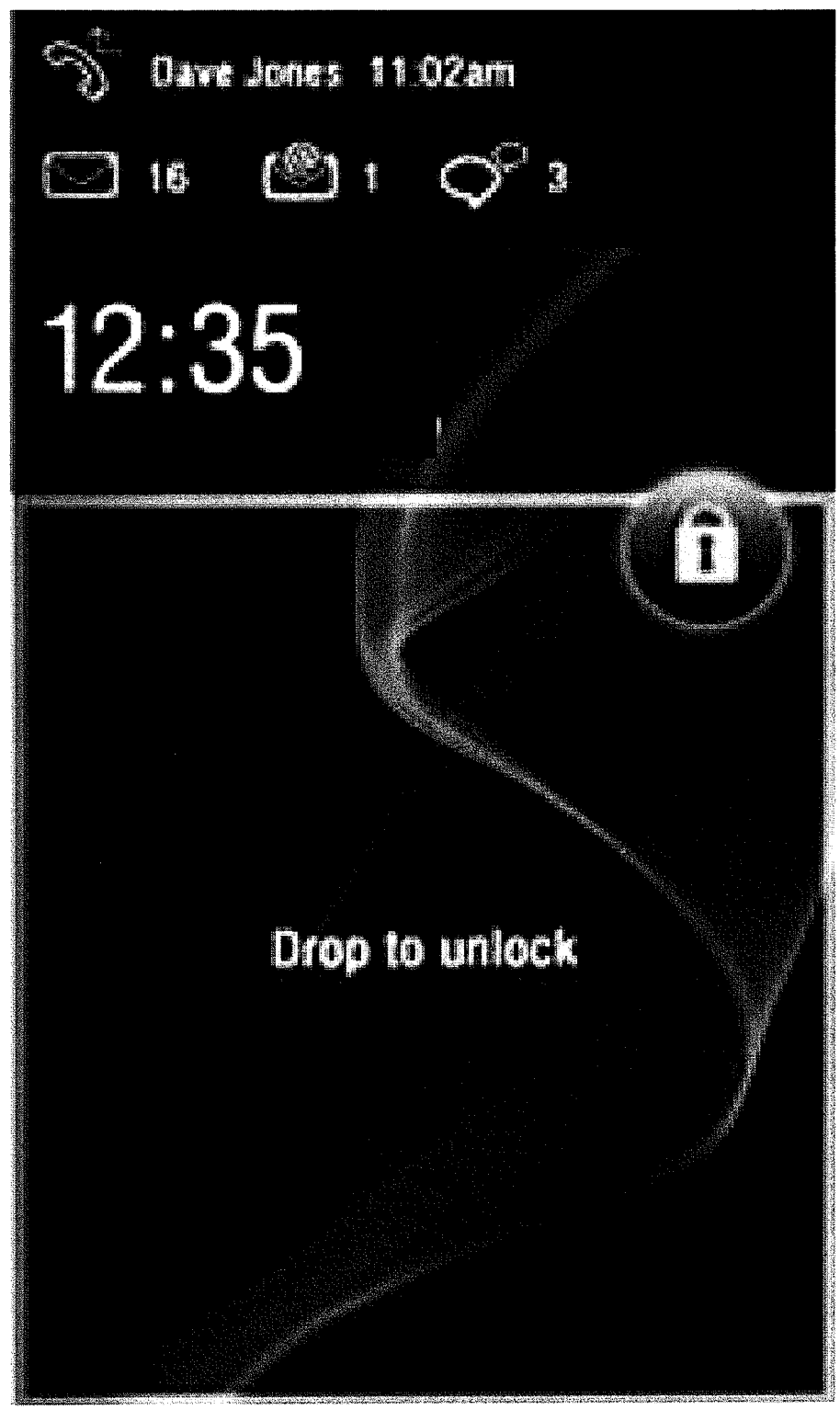
Figure 4B:
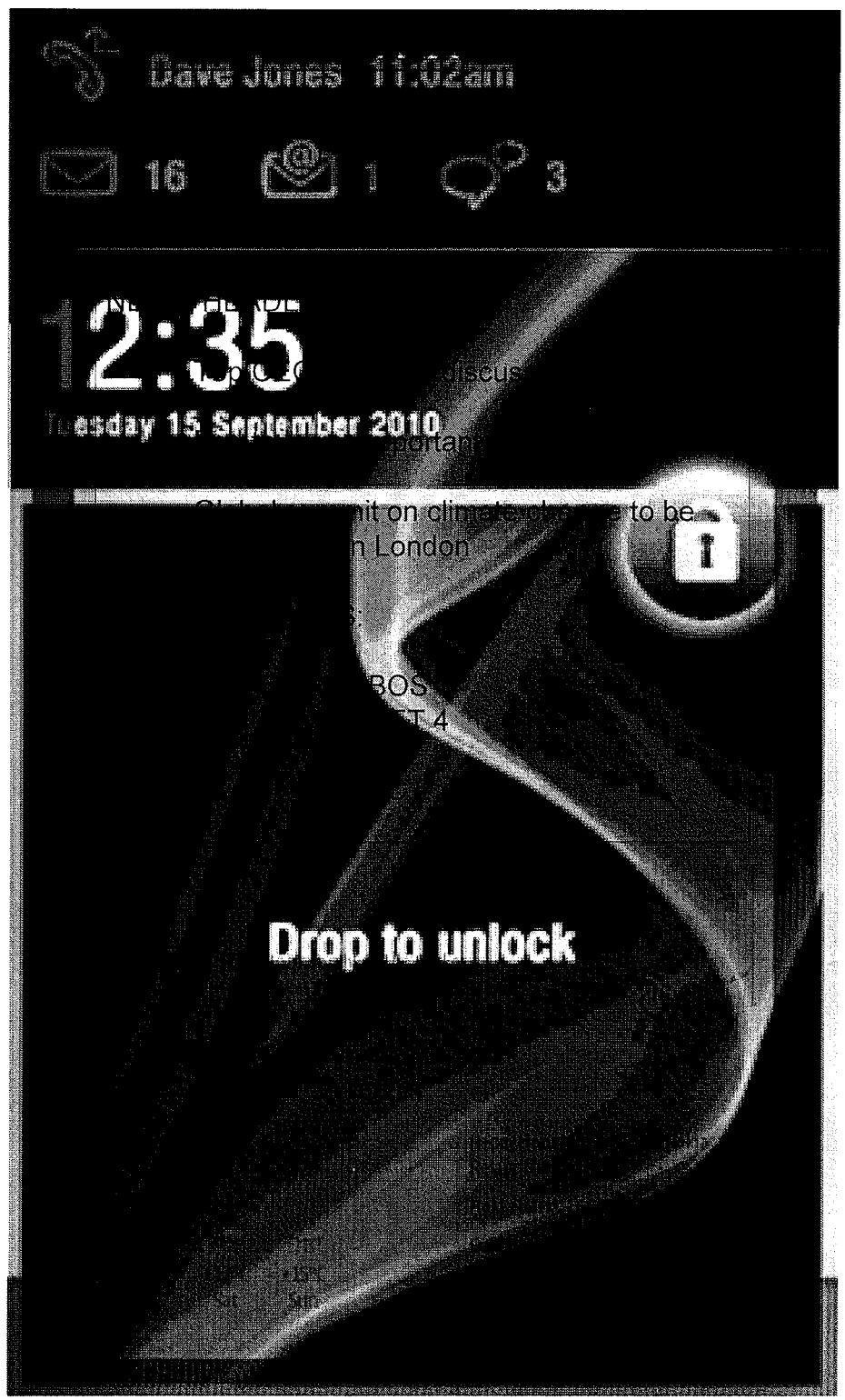
Figure 4C:
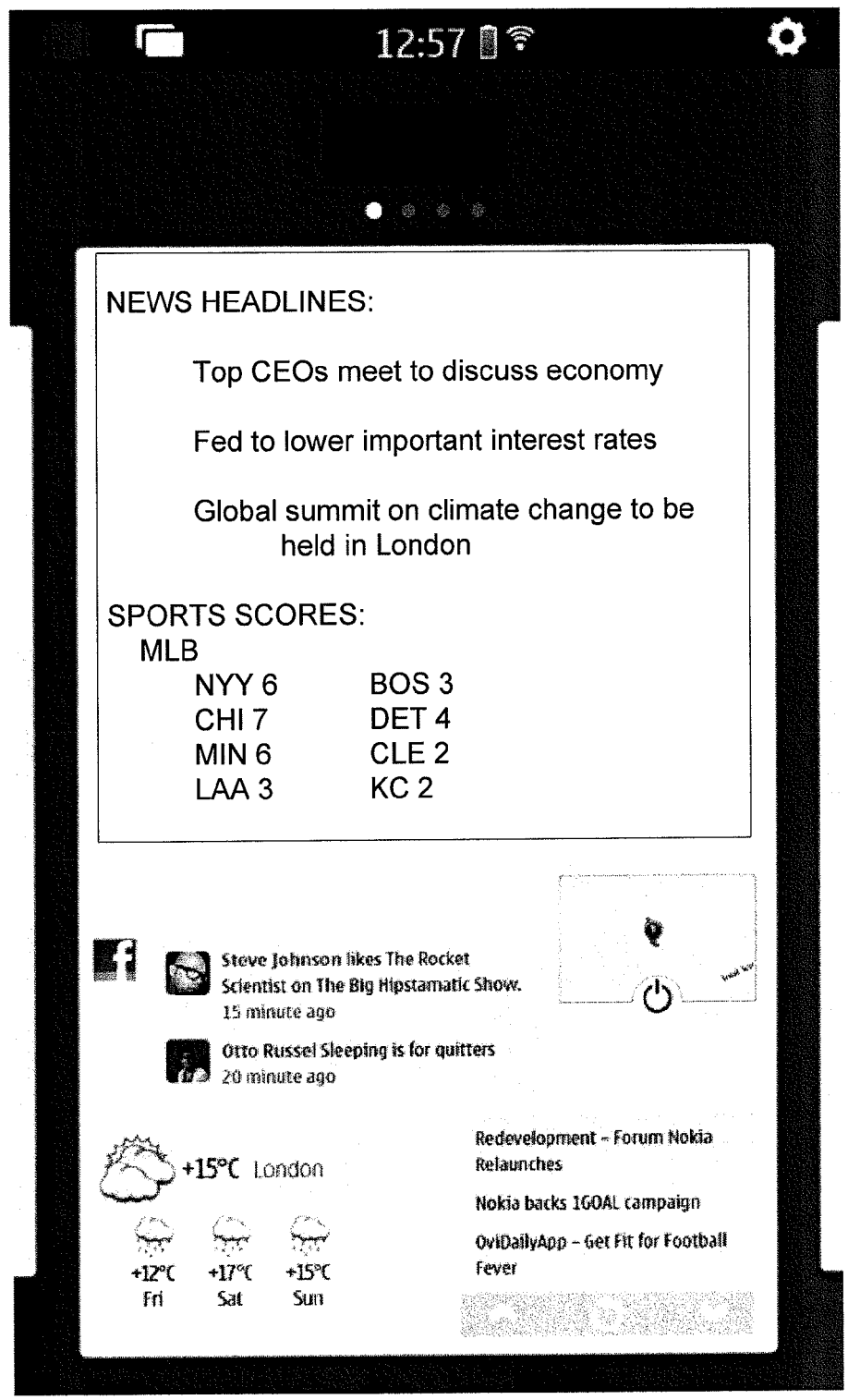
Figure 4D:
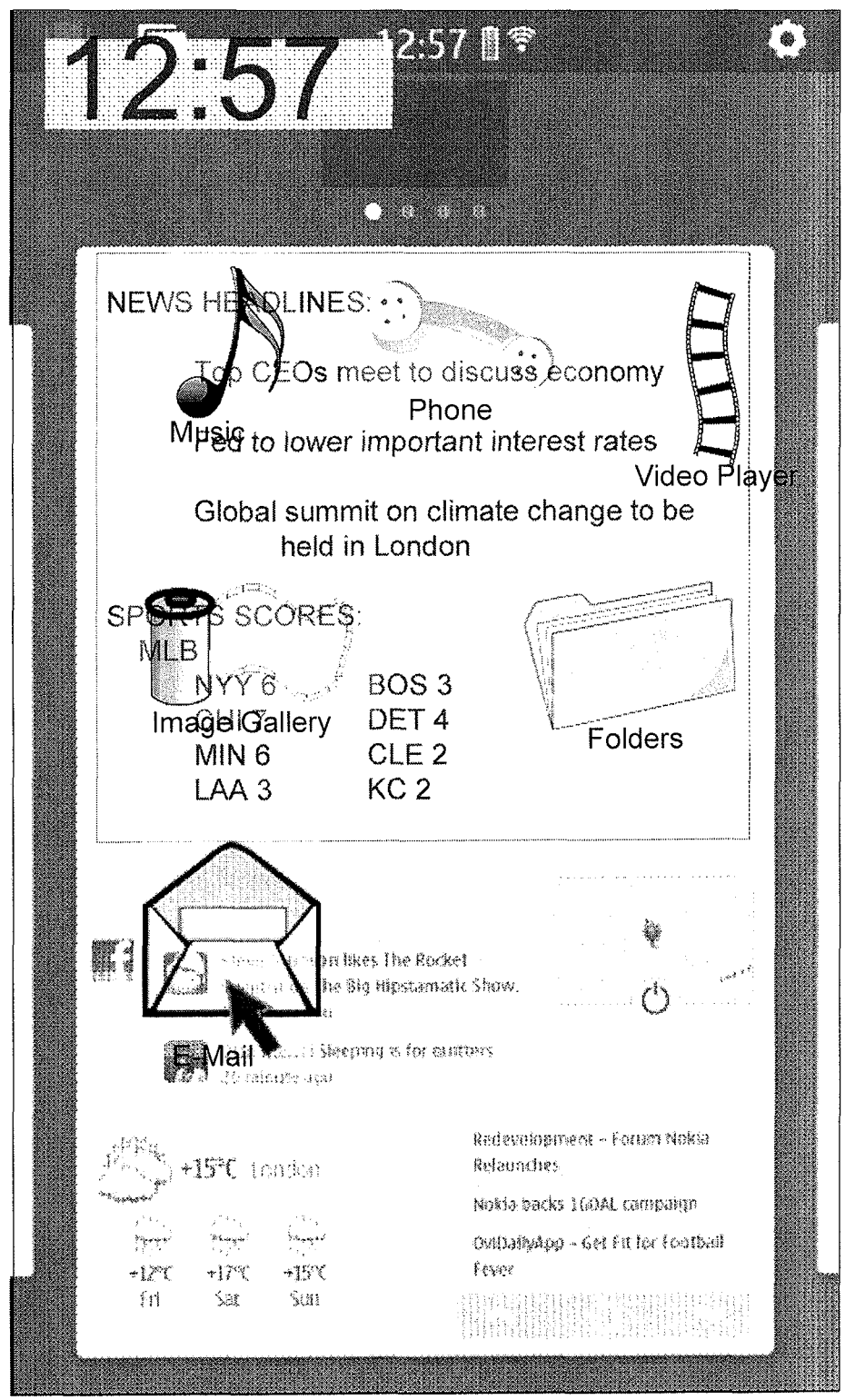
Figure 4E:
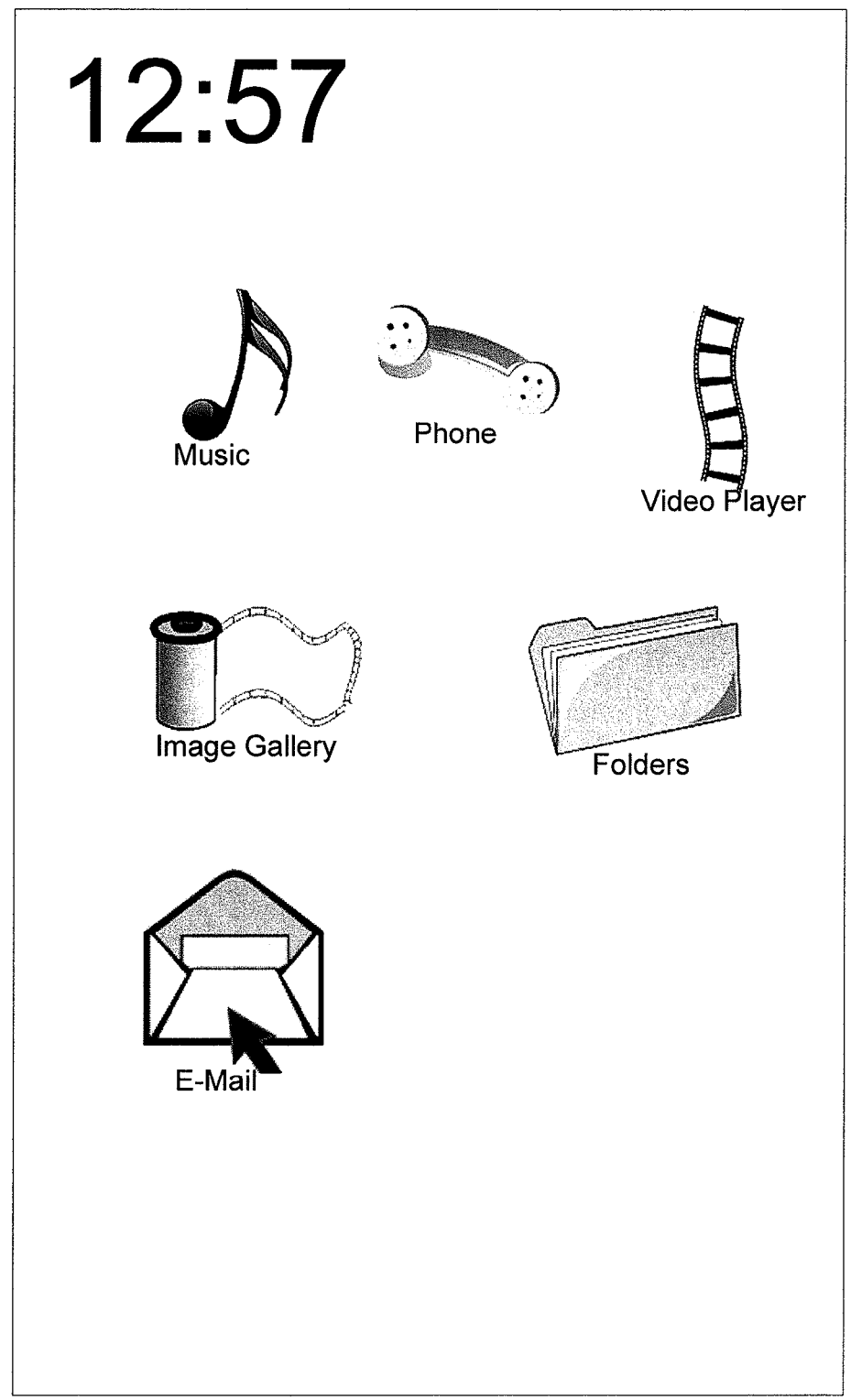

FIG. 4, which includes FIGS. 4A to 4E, illustrates some example screens that may be displayed while transitioning between states according to an example embodiment. Of note, the transitions shown in FIG. 4 include transitions between a locked state (FIG. 4A), a transitional state (FIG. 4C) and an unlocked state (FIG. 4E). However, the locked state could be replaced with a sleep state in some embodiments and thus the initial screen could be completely blank or blackened.

As shown in FIG. 4A, the device may initially be in a locked state such that only a locked screen is displayed (perhaps with minimal information thereon such as the time and date). In response to the initiation of a transition gesture at any point on the display (or in some examples in a specific transition gesture location), the display of the locked screen may begin to fade and the underlying content (or some other content specific to the transitional state) may begin to become visible as shown in FIG. 4B. The underlying content may be content associated with any function or application that was being displayed prior to the device being locked. In this example, the underlying content may be web content. However, in other situations, the underlying content may be video, audio or other content. In some cases, a gesture may be applied anywhere to go from the locked state to the transitional state. However, in the transitional state, the gesture may be used to take the user to the unlocked state that corresponds to an icon or application over which (or nearest to which) the gesture was performed.

The underlying content may become gradually more visible while the transition gesture is being applied until the transition gesture has been applied for a predetermined (e.g., above a threshold) amount of time. When the predetermined amount of time is reached, the underlying content may be revealed as shown in FIG. 4C, which displays the transitional state. The transitional state may, in some cases, be a read-only state where homescreen data is displayed. However, in other cases, the transitional state may be a state where other data (e.g., data associated with the transitional state) may be displayed either in a read-only or limited interaction manner. In some cases, the transitional state may provide user configurable data such as, for example, a number of new messages, time of day, location, and/or the like. In this example, the web content of the underlying content may be clearly displayed after being progressively revealed based on the application of the transition gesture. However, if the underlying content was video or audio, the corresponding content may begin to be rendered when the transition to the transitional state is fully completed.

In an example embodiment, once the transitional state is reached, the underlying content may be revealed in the transitional state for as long as contact of at least one object with the screen is maintained. If the user lifts all objects out of contact with the screen, a reversion from the transitional state (of FIG. 4C) back to the locked state (of FIG. 4A) may be performed by fading from the view of the underlying content back into the locked state view. However, if at any point the user continues to apply the transition gesture, progress may continue through FIG. 4D toward unlocking the device. Thus, for example, if the transition gesture continues to be applied, a view associated with the unlocked state (e.g., a home screen view shown in FIG. 4E) may begin to fade in as the underlying content associated with the transitional state begins to fade out. FIG. 4D illustrates the gradual transition between the transitional state to the unlocked state as the underlying content fades away and the home screen view fades into view. If the transition gesture is applied for a predetermined (or threshold) amount of time from the transitional state, the device may be fully unlocked and the unlocked screen of FIG. 4E may be displayed. As shown in FIG. 4E, a home screen (e.g., with different icons or menus associated with available applications or functions) may be presented and the user may be fully able to interact with items on the home screen or other screen presented when the device is unlocked.

If the user stops applying the transition gesture during any particular transition, the display may revert to the previous valid state. Thus, for example, if the user is transitioning from the locked state to the transitional state and stops applying the transition gesture, the device would go back to the locked state (e.g., presenting the display of FIG. 4A). If the user is transitioning from the transitional state to the unlocked state and stops applying the transition gesture, but maintains an object in contact with the screen, the device may go back to the transitional state (e.g., presenting the display of FIG. 4C) for as long as contact is maintained with the screen. If contact is not maintained with the screen, the device would go all the way back to the locked state.

It should be appreciated that although the examples described above generally describe a transition from the locked state to the unlocked state (via the transitional state), example embodiments may utilize the transition gesture to perform transitions in the reverse direction as well. Thus, for example, the transition gesture can also be used to transition from the unlocked state to a locked state (or sleep state). FIG. 5 shows an example interaction cycle for states that may be transitioned through according to an example embodiment. As shown in FIG. 5, the transition gesture may be used to cycle from locked state 200 to transitional state 210. The transition gesture may also be used to transition from the transitional state 210 to the unlocked state 220. The device may then transition from the unlocked state 220 to a sleep state 230. The device may go blank in the sleep state 230 and not respond to further transition gestures. Later, if the device is touched, the device may wake up in the locked state 200. In some embodiments, the device may be enabled to transition directly between the locked state 200 and unlocked state 220 using some other functional button or interaction other than the transition gesture. Moreover, in some devices both a transition gesture and a direct unlock gesture may be available so that the user can unlock the device using a standard method, or enter into a transitional state if the user only wishes to access specific information.

Although the example embodiment described above relates to the display of underlying content or the last content that was presented prior to the device being locked, it should be appreciated that some embodiments may replace the underlying content with any of a number of other alternative content options. For example, the transition manager 88 may be configured to enable the user to define specific content, interactions or responses that are to be provided in the transitional state. In an example embodiment, the user may define one or a plurality of content items to be displayed in the transitional state. For example, the user may define that social network account status or content should be displayed in the transitional state, or that email content should be provided. Alternatively or additionally, the user may define specific sound effects or visual effects (e.g., video, images, animation sequences, etc.) to be rendered in the transitional state. Weather reports or other specifically defined applications may also provide content for display in the transitional state according to user defined rules or settings.

In an example embodiment, the content rendered in the transitional state could even be randomly selected. Thus, the user may not have specific control over what is rendered in the transitional state. The content could be totally random (e.g., selected from any content accessible from the device) or randomly selected from within a particular topic or folder. As such, for example, some embodiments may be used to provide entertainment or even education as photos or musical content related to a specific theme may be presented at random, or topically related content (e.g., study flash cards or notes) could be presented at random in response to transitioning to the transitional state using the transition gesture.

Accordingly, some example embodiments may provide for enabling users to transition between a locked state and an unlocked state through a transitional state. Moreover, the transitional state may present content that may be defined according to predetermined rules or settings. More generally, example embodiments may provide for transitioning between two states responsive to a transition gesture where each state is associated with a display and the transition between displays is progressively conducted based on a degree of repetition (e.g., how many cycles or how long the cycles have been conducted) of the transition gesture. As such, for example, the transitional state (or any other state) may be faded into and out of responsive to repetition of a transition gesture. As such, example embodiments may provide for an apparatus (e.g., the processor 70 or a chip set including the processor 70) for performing state transitions based on the application of a transition gesture.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block (s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving an indication of a transition gesture being performed at a touch screen display of a device in a first device state at operation 300. The method may further include causing initiation of transition from the first device state to a second device state responsive to performance of the transition gesture at operation 310. The initiation of transition may include progressively replacing a display view associated with the first device state with a display view associated with the second device state based on a degree of repetition of the transition gesture. For example, an amount of progressive replacement of the display view associated with the first device state by the display view associated with the second device state may be proportional to an amount of cycling of the transition gesture (e.g., in terms of the number of cycles or the time for which the cycles have been applied).

In some embodiments, certain ones of the operations above may be modified or further amplified as described below. Moreover, in some embodiments additional optional operations may also be included (some examples of which are shown in dashed lines in FIG. 6). It should be appreciated that each of the modifications, optional additions or amplifications below may be included with the operations above either alone or in combination with any others among the features described herein. In some embodiments, the method may further include completing the transition from the first device state to the second device state responsive to cycling of the transition gesture for a predetermined period of time or a predetermined amount of cycles at operation 320. In an example embodiment, the method may further (or alternatively) include determining an orientation of a user of the touch screen display based on a direction of movement of an object performing the transition gesture and rendering content to the touch screen display based on the determined orientation of the user at operation 330. In some cases, the method may further (or alternatively) include initiating transition from the second device state to a third device state based on repetition of the transition gesture after completing transition to the second device state at operation 340. In an example embodiment, causing initiation of the transition may include reverting to the first device state responsive to stopping the transition gesture prior to completing a transition from the first device state to the second device state or responsive to removing all objects associated with performance of the transition gesture from contact with the touch screen display. In some cases, the first device state may be any one of an unlocked state, a locked state or a transitional state and the second device state may be a different one of the unlocked state, the locked state or the transitional state. In some embodiments, the transitional state may be a state in which predefined content is displayed and/or a state in which one or more user selected content items are displayed, including themed content or random content.

In an example embodiment, an apparatus for performing the method of FIG. 6 above may comprise a processor (e.g., the processor 70) configured to perform some or each of the operations (300-340) described above. The processor 70 may, for example, be configured to perform the operations (300-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-340 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 300-340.

An example of an apparatus according to an example embodiment may include at least one processor and at least one memory including computer program code. The at least one memory and the computer program code may be configured to, with the at least one processor, cause the apparatus to perform the operations 300-340 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 300-340 (with or without the modifications and amplifications described above in any combination).

In some cases, the operations (300-340) described above, along with any of the modifications may be implemented in a method that involves facilitating access to at least one interface to allow access to at least one service via at least one network. In such cases, the at least one service may be said to perform at least operations 300 to 340.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a transition gesture being performed at a touch screen display of a device in a first device state;
   receiving an indication of a repetition of the transition gesture in a repeated motion pattern; and
   causing initiation of transition from the first device state to a second device state responsive to performance of the transition gesture, the initiation of transition comprising progressively replacing a display view associated with the first device state with a display view associated with the second device state based on a degree of the repetition of the transition gesture such that content of the display view associated with the second device state is gradually revealed based on the degree of the repetition of the transition gesture, and wherein the content of the display view associated with the second device state is gradually revealed proportionally to the degree of repetition of the transition gesture.

2. The method of claim 1, further comprising completing the transition from the first device state to the second device state responsive to cycling of the transition gesture for a predetermined period of time or a predetermined amount of cycles.

3. The method of claim 1, further comprising determining an orientation of a user of the touch screen display based on a direction of movement of an object performing the transition gesture and rendering content to the touch screen display based on the determined orientation of the user.

4. The method of claim 1, wherein causing initiation of the transition comprises reverting to the first device state responsive to stopping the transition gesture prior to completing a transition from the first device state to the second device state or responsive to removing all objects associated with performance of the transition gesture from contact with the touch screen display.

5. The method of claim 1, further comprising initiating transition from the second device state to a third device state based on repetition of the transition gesture after completing transition to the second device state.

6. The method of claim 1, wherein the first device state is any one of an unlocked state, a locked state or a transitional state and the second device state is a different one of the unlocked state, the locked state or the transitional state.

7. The method of claim 6, wherein the transitional state comprises a state in which predefined or random content is displayed.

8. The method of claim 6, wherein the transitional state comprises a state in which one or more user selected content items are displayed.

9. The method of claim 1, wherein the transition further comprises gradually fading from the display view associated with the first device state to the display view associated with the second device state.

10. The method of claim 1, wherein the transition gesture is repeated in a repeated motion pattern relative to the touch screen display.

11. An apparatus comprising at least one processor and at least one memory including computer program code, the at least one memory and the computer program code configured to, with the processor, cause the apparatus to at least:
    receive an indication of a transition gesture being performed at a touch screen display of a device in a first device state;
    receive an indication of a repetition of the transition gesture in a repeated motion pattern; and
    cause initiation of transition from the first device state to a second device state responsive to performance of the transition gesture, the initiation of transition comprising progressively replacing a display view associated with the first device state with a display view associated with the second device state based on a degree of the repetition of the transition gesture such that content of the display view associated with the second device state is gradually revealed based on the degree of the repetition of the transition gesture, wherein the content of the display view associated with the second device state is gradually revealed proportionally to the degree of repetition of the transition gesture.

12. The apparatus of claim 11, wherein the at least one memory and the computer program code are further configured to, with the processor, cause the apparatus to complete the transition from the first device state to the second device state responsive to cycling of the transition gesture for a predetermined period of time or a predetermined amount of cycles.

13. The apparatus of claim 11, wherein the at least one memory and the computer program code are further configured to, with the processor, cause the apparatus to determine an orientation of a user of the touch screen display based on a direction of movement of an object performing the transition gesture and render content to the touch screen display based on the determined orientation of the user.

14. The apparatus of claim 11, wherein the at least one memory and the computer program code are configured to, with the processor, cause the apparatus to cause initiation of the transition by reverting to the first device state responsive to stopping the transition gesture prior to completing a transition from the first device state to the second device state or responsive to removing all objects associated with performance of the transition gesture from contact with the touch screen display.

15. The apparatus of claim 11, wherein the at least one memory and the computer program code are further configured to, with the processor, cause the apparatus to initiate transition from the second device state to a third device state based on repetition of the transition gesture after completing transition to the second device state.

16. The apparatus of claim 11, wherein the first device state is any one of an unlocked state, a locked state or a transitional state and the second device state is a different one of the unlocked state, the locked state or the transitional state.

17. The apparatus of claim 16, wherein the transitional state comprises a state in which one or more user selected content items are displayed.

18. A computer program product comprising a computer-readable storage medium bearing computer program code embodied therein for use with a computer, the computer program code comprising code for:
receiving an indication of a transition gesture being performed at a touch screen display of a device in a first device state;
receiving an indication of a repetition of the transition gesture in a repeated motion pattern; and
causing initiation of transition from the first device state to a second device state responsive to performance of the transition gesture, the initiation of transition comprising progressively replacing a display view associated with the first device state with a display view associated with the second device state based on a degree of the repetition of the transition gesture such that content of the display view associated with the second device state is gradually revealed based on the degree of the repetition of the transition gesture, and wherein the content of the display view associated with the second device state is gradually revealed proportionally to the degree of repetition of the transition gesture.

19. The computer program product of claim 18, further comprising code for completing the transition from the first device state to the second device state responsive to cycling of the transition gesture for a predetermined period of time or a predetermined amount of cycles.

20. The computer program product of claim 18, further comprising code for determining an orientation of a user of the touch screen display based on a direction of movement of an object performing the transition gesture and rendering content to the touch screen display based on the determined orientation of the user.

21. The computer program product of claim 18, wherein code for causing initiation of the transition includes code for reverting to the first device state responsive to stopping the transition gesture prior to completing a transition from the first device state to the second device state or responsive to removing all objects associated with performance of the transition gesture from contact with the touch screen display.

22. The computer program product of claim 18, further comprising code for initiating transition from the second device state to a third device state based on repetition of the transition gesture after completing transition to the second device state.

23. The computer program product of claim 18, wherein the first device state is any one of an unlocked state, a locked state or a transitional state and the second device state is a different one of the unlocked state, the locked state or the transitional state.

24. The computer program product of claim 23, wherein the transitional state comprises a state in which predefined or random content is displayed.

25. The computer program product of claim 23, wherein the transitional state comprises a state in which one or more user selected content items are displayed.

* * * * *